(12) United States Patent
Tunick

(10) Patent No.: US 12,477,056 B2
(45) Date of Patent: Nov. 18, 2025

(54) SMARTPHONE CASING WITH LED FLASHLIGHT

(71) Applicant: NATIONAL EXPRESS, INC., Norwalk, CT (US)

(72) Inventor: Jason Thomas Tunick, Easton, CT (US)

(73) Assignee: National Express Inc., Norwalk, CT (US)

( * ) Notice: Subject to any disclaimer, the term of this patent is extended or adjusted under 35 U.S.C. 154(b) by 50 days.

(21) Appl. No.: 18/582,855

(22) Filed: Feb. 21, 2024

(65) Prior Publication Data

US 2025/0023974 A1 Jan. 16, 2025

Related U.S. Application Data

(60) Provisional application No. 63/513,718, filed on Jul. 14, 2023.

(51) Int. Cl.
| | | |
|---|---|---|
| *H04M 1/22* | (2006.01) | |
| *F21L 4/02* | (2006.01) | |
| *F21L 4/08* | (2006.01) | |
| *F21V 23/00* | (2015.01) | |
| *F21V 23/04* | (2006.01) | |
| *F21V 33/00* | (2006.01) | |

(Continued)

(52) U.S. Cl.
CPC ............ *H04M 1/22* (2013.01); *F21L 4/027* (2013.01); *F21L 4/085* (2013.01); *F21V 23/009* (2013.01); *F21V 23/0414* (2013.01); *F21V 33/0052* (2013.01); *H04M 1/21* (2013.01); *F21Y 2115/10* (2016.08)

(58) Field of Classification Search
CPC ...... A45C 11/002; A45C 11/001; H04M 1/22; F21V 23/0414; F21V 33/0052; F21L 4/027; F21L 4/085; F21L 4/22
See application file for complete search history.

(56) References Cited

U.S. PATENT DOCUMENTS

| | | | | |
|---|---|---|---|---|
| 4,992,704 A | * | 2/1991 | Stinson ................. | H05B 45/40 |
| | | | | 362/800 |
| 8,428,644 B1 | * | 4/2013 | Harooni ............... | H04B 1/3888 |
| | | | | 362/551 |
| 9,190,639 B2 | * | 11/2015 | Kim ....................... | H04M 1/185 |

(Continued)

OTHER PUBLICATIONS

International Search Report Written Opinion for PCT/US2024/033591, mailed Sep. 17, 2024.

(Continued)

*Primary Examiner* — Ismael Negron
(74) *Attorney, Agent, or Firm* — McHale & Slavin, P.A.

(57) ABSTRACT

A smartphone casing with an LED flashlight unit and battery pack. The casing is sized to partially encapsulate the shell of a smartphone. The back wall includes an LED light unit coupled to a battery pack. An LED activation button provides a direct coupling between the battery pack and the LED light unit. The power pack independently stores electrical power in its lithium-ion pack. There are 5 sequential modes. The first three modes initiate light emission at 600* lumen, 400* lumen and 200* lumen. The fourth mode is termed a Strobe Self-Defense to stifle and hinder an assailant in a hostile situation. The fifth mode is a Beacon to give a signal of emergency.

14 Claims, 5 Drawing Sheets

(51) Int. Cl.
*H04M 1/21* (2006.01)
*F21Y 115/10* (2016.01)

(56) References Cited

U.S. PATENT DOCUMENTS

| | | | | |
|---|---|---|---|---|
| 9,197,273 | B2 * | 11/2015 | Haleluk | H04M 1/0202 |
| 9,300,347 | B1 * | 3/2016 | Coverstone | H04M 1/724092 |
| 9,442,346 | B2 * | 9/2016 | Gantz | H04N 23/633 |
| 10,082,725 | B1 * | 9/2018 | Penaflor | H04M 1/026 |
| 10,495,946 | B2 * | 12/2019 | Shoemake | H04M 1/22 |
| 2014/0340573 | A1 * | 11/2014 | Clawson | H04M 1/185 |
| | | | | 348/371 |
| 2016/0209025 | A1 * | 7/2016 | Matthews | H04M 1/0254 |
| 2019/0342740 | A1 | 11/2019 | Coverstone | |
| 2020/0093238 | A1 * | 3/2020 | Kumar | A45C 11/00 |
| 2023/0297138 | A1 * | 9/2023 | Ahari Hashemi | A45C 11/00 |
| | | | | 455/575.8 |
| 2024/0405580 | A1 * | 12/2024 | del Toro | A45C 11/00 |

OTHER PUBLICATIONS

Notification of Transmittal of the International Search Report and Written Opinion from the International Searching Authority for PCT/US2024/033591, mailed Sep. 17, 2024.

\* cited by examiner

SMARTPHONE CASING WITH LED FLASHLIGHT

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/513,718, entitled "SMARTPHONE FLASHLIGHT CASING", filed Jul. 14, 2023. The contents of the above referenced application are incorporated herein by reference in its entirety.

FIELD OF THE INVENTION

This invention is directed to the field of smartphones and, in particular, to a smartphone cover with an integral flashlight and rechargeable battery.

BACKGROUND OF THE INVENTION

The incorporation of a flashlight on a smartphone has proven extremely useful for countless reasons. The practical ability to illuminate low-light or dark environments can be an everyday occurrence, and especially useful in emergencies. The flashlight provides portable lighting when a normal light source is insufficient. For instance, searching for lost items is most beneficial if the search area is illuminated. Supplemental illumination of books, magazines, restaurant bills, and emergency lighting are all benefits of a flashlight incorporated into a smartphone.

For instance, the flashlight is especially useful for emergency situations where no light source is available, such as replacing a flat tire in the dark, or providing emergency lighting when a storm knocks out a power grid. The flashlight can even be used for signaling or Morse code wherein non verbal communications across distances can be made. A flashlight can be used temporarily to disorient or surprise an aggressor by shining the light directly into their eyes, providing a momentary advantage to escape or seek help. The flashlight can be used to closely inspect objects for defects or identify imperfections. The flashlight can be used for photography and videography to improve the quality of the images and reducing blur. A conventional smartphone includes magnification ability wherein the flashlight can be used to supplement the magnification.

The flashlight on a conventional smartphone is based upon LED(s) (light-emitting diodes) located near the camera module. The conventional LED Flashlight component consists of multiple LED bulbs arranged in a cluster capable of emitting a high-intensity light when an electric current passes through them. The flashlight functionality is controlled by the smartphone's operating system. When the flashlight is contacted through a software interface, it sends a signal to the phone's hardware to power on the LED flash. As the electric current flows through the LEDs, they emit a bright white light. The light emitted from the LED flash is much brighter and more focused than the ambient light produced by the smartphone's display.

Unfortunately, a flashlight can prematurely drain a smartphone battery. Individuals are surprised at how quickly a flashlight can drain a battery. For this reason the smartphone flashlight may be sized to provide limited illumination so as not to overly tax the smartphone battery. While a smartphone flashlight has become an indispensable safety device, the length of usable time is limited. Further, the illumination of a flashlight can be throttled so that battery strength does not cause a loss of cellular communication wherein the operation of the flashlight can create a situation wherein an emergency cannot be addressed.

SUMMARY OF THE INVENTION

A smartphone casing with an LED flashlight unit and battery pack. The casing is sized to partially encapsulate the shell of a smartphone. The casing is defined by a back wall, upper end wall, lower end wall, and first and second side walls. Each said wall constructed and arranged to capture a smartphone shell and secure the smartphone in a protected position with only the operating screen of the smartphone exposed. The back wall includes an LED light unit coupled to a battery pack. An LED activation button provides a direct coupling between the battery pack and the LED light unit.

An objective of the invention is to provide a flashlight casing releasably securable to a smartphone, the casing having at least one LED formed integral thereto and a rechargeable battery pack secured to said casing with a case mounted activation button.

Another objective of the invention is to provide a high intensity flashlight not possible with a conventional smartphone battery.

Still another objective of the invention is to provide rechargeable battery pack that can be coupled to a smartphone battery providing a supplemental power supply to the smartphone.

Another objective of the invention is to provide a flashlight casing for a smartphone having an LED configured to emit light of different colors and intensities.

Still another objective of the invention is to provide a flashlight configured to toggle an LED on and off or cycle through different lighting modes to signal an emergency situation.

Yet still another objective of the invention is to include a sound sensor wherein the LED will flash in response to the beat of music. The flashing is beneficial for concerts and the like wherein the coordinated flashing of the light with the sound enhances the concert experience by expressing favoritism to a song beat.

Yet another objective of the invention is to provide a smartphone casing flashlight having light mode emissions at 600* lumen, 400* lumen, and 200* lumen. Another mode is a Strobe Self-Defense to stifle and hinder an assailant in a hostile situation. Still another mode is a Beacon to give a signal of emergency.

Features of the invention include: ability to export power to external devices; Bluetooth activation to sync with smartphone; connectivity to encased smartphone; top mounted camera with night vision; programmable alarm to flash with set time; motion and sound sensor which can either activate LED or give notification to an App; registered user's information (identification, medical records if phone is locked); GPS chip backup if device is lost or if someone is lost and needs to be found; and a wireless charge export panel.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
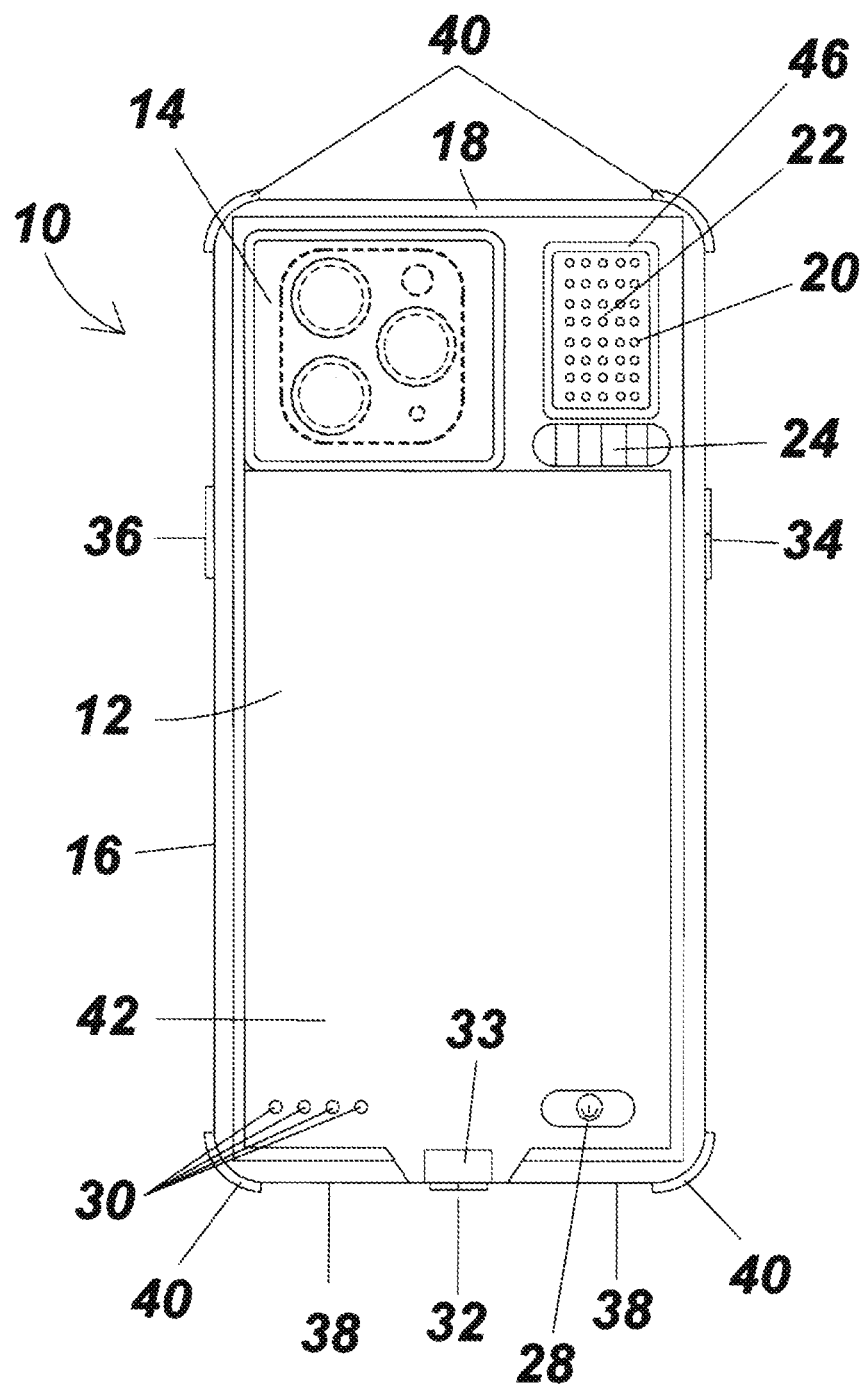
FIG. 1 is a rear view of a smartphone flashlight casing of the instant invention.
Figure 2:
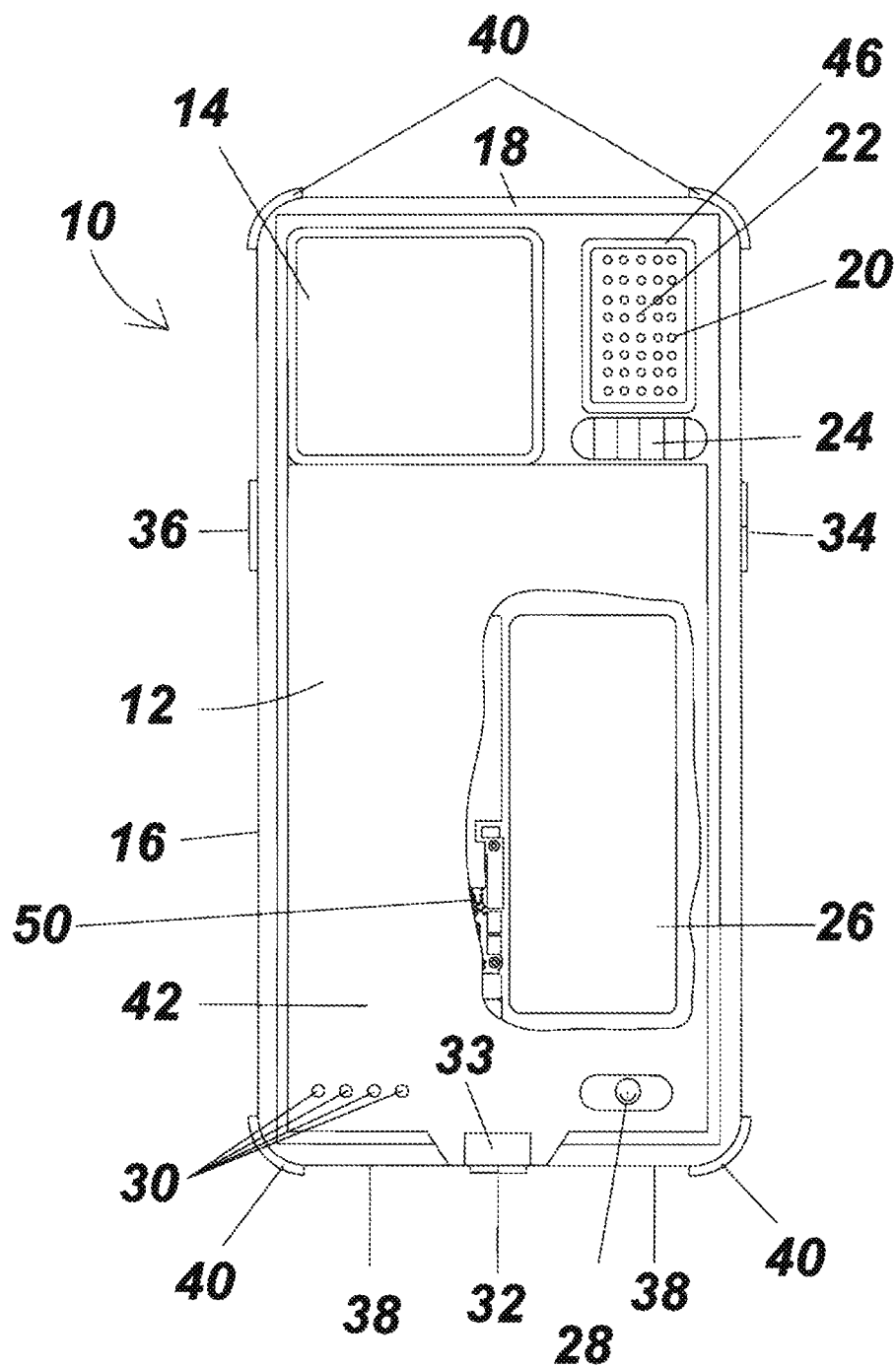
FIG. 2 is a rear view of the smartphone flashlight casing with a cut-out exposing a rechargeable battery pack.
Figure 3:
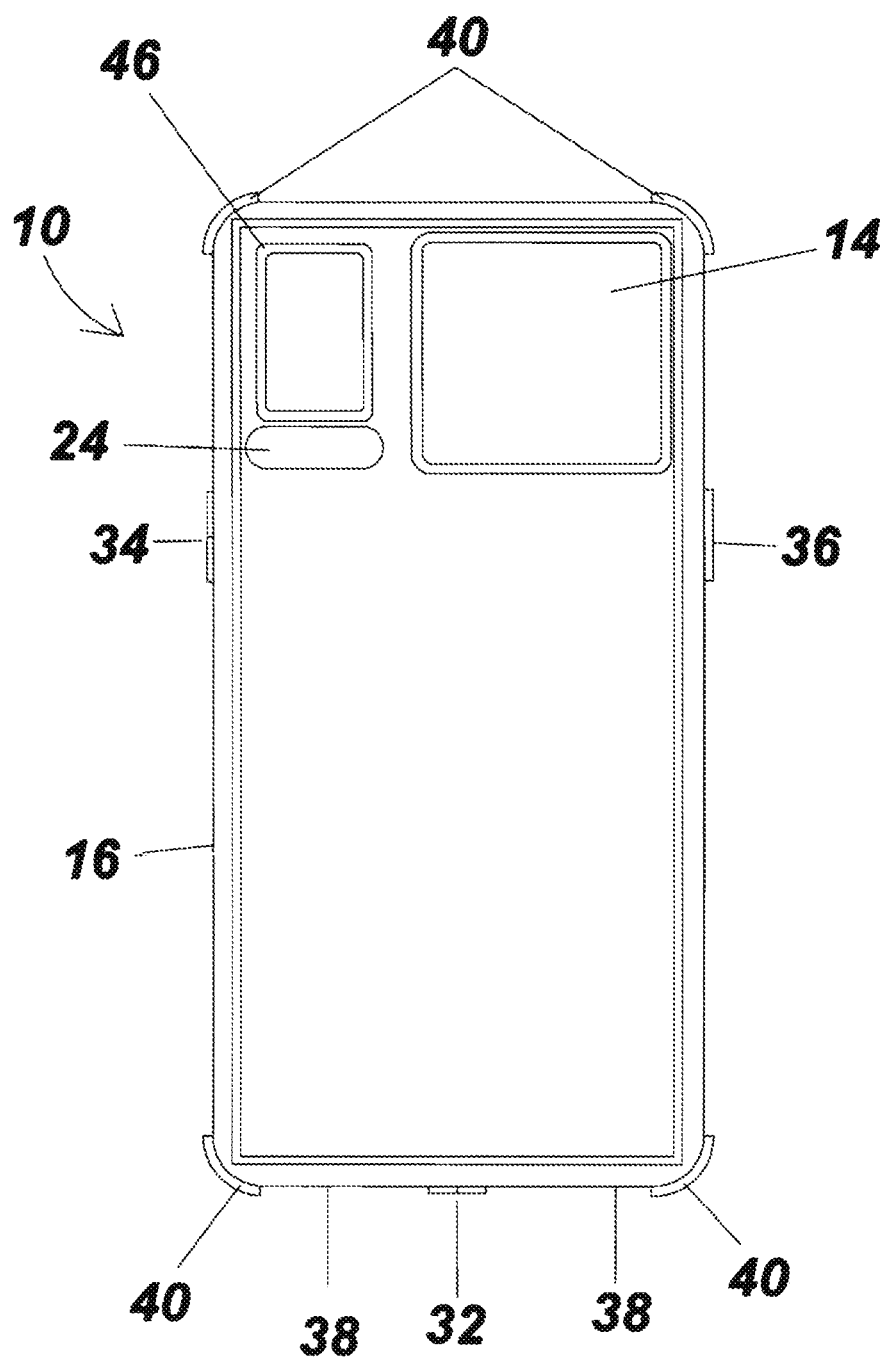
FIG. 3 is a front view of the smartphone flashlight casing.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

In a preferred embodiment, the smartphone flashlight casing affixes to and interfaces with an iPhone or the like. The device operates as a battery booster pack coupled to an LED light unit. The purpose of the battery booster pack feature is to supplement the encased smartphone battery life. The supplemental battery pack when activated by its face power on/off button initiated a power feed to the encased smartphone. The supply power pack independently stores electrical power in its lithium-ion pack. The battery can also power the LED light unit to augment light emission. The average encased smartphone has a light emission rate of 50 lumen, the battery pack of the instant invention has a light emission rate of 600* lumen providing greater visibility in darkness. When activated by its face activation button, there are 5 sequential modes. The first three modes initiate light emission at 600* lumen, 400* lumen then 200* lumen. The fourth mode is termed a Strobe Self-Defense. The purpose of Strobe Self-Defense is to stifle and hinder an assailant in a hostile situation. The fifth mode is termed a Beacon. The purpose of Beacon is to give a signal of emergency. Since the battery pack provides independently powered, the casing may be separated from the encased smartphone and used either as a camping emergency distress beacon or as an automobile roadside beacon. Another attribute of the device is its rubber circumference band to provide shock resistance. In opposition to the commonly used smartphone cases which are made of plastic, the shock-concussion is absorbed by the rubber circumference band. This ability to absorb shock stops the shock-concussion from traveling into the encased smartphone.

Now referring to the figures, a flashlight casing 10 is releasably securable to a smartphone. The case formed from a rectangular shaped back panel 12 with a camera lens porthole 14. The case having a side surface 16 constructed and arranged to secure to a conventional smartphone, preferable with a rubber shock concussion band 18. At least one LED 20 is formed integral to the casing 10. In a preferred embodiment, the flashlight casing 10 has an LED light unit 22 having up to forty LEDs 20. An activation button 24 initiates the LED lights while operating the flashlight independent of the smartphone.

The rechargeable battery pack 26 is further secured to the casing 10 and electrically coupled to the LED 20 and can be turned on and off via a booster pack activation button 28. When the rechargeable battery pack 26 is powered, a power level indicator light 30 located on the back panel 12 displays the amount of power left on the rechargeable battery pack 26. The casing 10 includes a charging port 32 for recharging the rechargeable battery pack 26. In a preferred embodiment, the charging port 32 is covered by a rubber flap 33. A control circuit 50 is configured to control the operation of the LED 20 and rechargeable battery pack 26. The control circuit 50 allows the rechargeable battery pack 26 to be coupled to a smartphone battery providing a supplemental power supply.

The casing 10 includes an activation button 34 positioned on a side surface 16 of the casing 10. Also included on the side surface 16 of the casing 10 is a volume control cover 36 to protect the smartphone's volume buttons. The casing 10 may also include at least one speaker port 38 to allow sound to properly pass through the casing from the smartphone's speaker. In an alternative embodiment, the casing 10 may also include rubber corner bumpers 40 to provide more protection to the smartphone. Additionally, the back panel 12 of the casing 10 has a branding area 42 large enough to display a company's logo.

Alternatively, the control circuit 50 can interface with a smartphone App. The connectivity can be through the use of Bluetooth and can be switched on and off via a Bluetooth activation button 44 on the back panel 12. The smartphone app allows remote operation of the LED 20 for adjustment of illumination and strobing. The App can further dial 911 should an emergency be initiated wherein the LED cab signal a blinding light. The LED 20 can be configured to emit light of different colors and intensities. A light diffusion layer 46 positioned between the LED 20 and the back panel 12 can be used to provide uniform illumination. The activation button 24 or App is configured to toggle the LED 20 on and off or cycle through different lighting modes.

An App can provide remote light activation from Bluetooth synchronization, USB back up memory storage, party light/letter/number display, power activation, power level display, and quick self-defense.

Figure 4A:
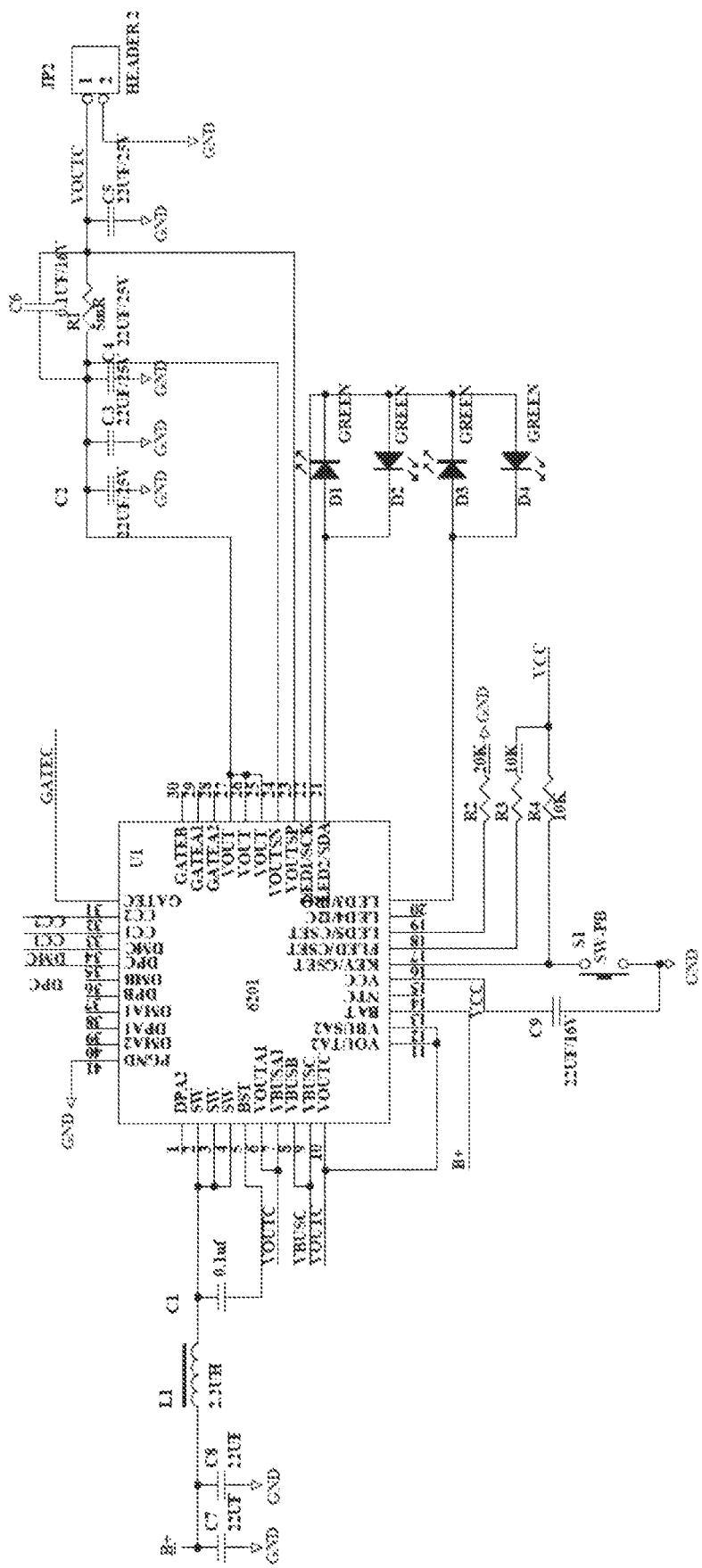
FIG. 4A is an electrical schematic of a microcontroller of the instant invention.
Figure 4D:
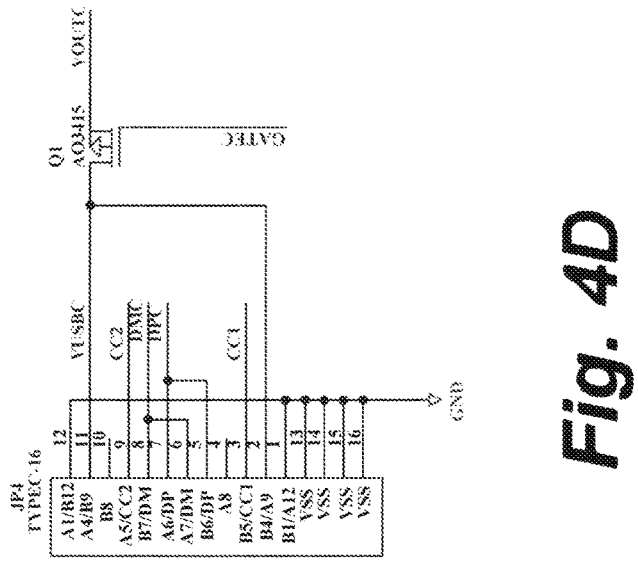
FIG. 4D is an electrical schematic of the digital communication module of the instant invention.
Figure 4B:
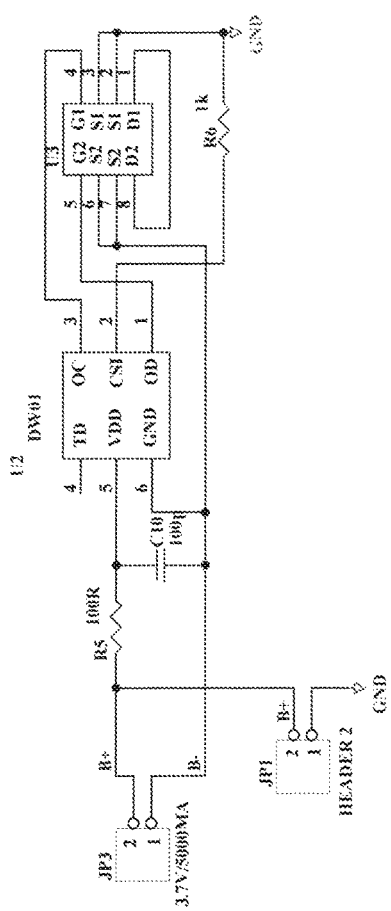
FIG. 4B is an electrical schematic of a signal processing module of the instant invention.
Figure 4C:
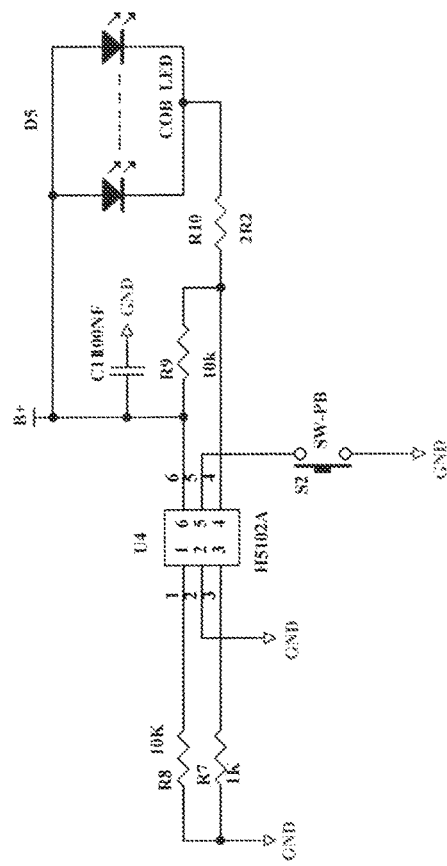
FIG. 4C is an electrical schematic of the LED module of the instant invention.

Now referring to FIGS. 4A through 4D, mounted circuit boards employ a substrate with a Chip-on-Board (COB) Light Emitting Diode (LED) having multiple chips mounted directly to the board to form a single module or array. The COB LEDs offer high luminous flux output by concentrating multiple chips in a small area, and allows for thermal management with the heat generated by the chips to be dissipated through the substrate. COB LEDs are highly energy-efficient and consume less power compared to traditional lighting sources while delivering comparable or higher brightness levels. Power to the COB LED is through a power switch S1 controlled through a processor 6201 for regulating power B+ with a second power switch S2 for the LEDs. Diodes D1-D4 maintain a constant voltage across their terminals, even when there are fluctuations in the input voltage. The diodes are used in voltage regulator to stabilize power supplies and protect from overvoltage conditions. Capacitor C2-C5 are used to filter out fluctuations in voltage and provide smooth DC (direct current) power. The capacitors further store energy temporarily for instant startup providing voltage regulation to stabilize the output voltage and reduce ripple.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A combination comprising:
   a smartphone having a camera lens;
   a case having a rectangular shaped back panel with a porthole and a side surface;
   at least one LED formed integral to said casing;
   a rechargeable battery pack secured to said casing and electrically coupled to said LED;
   a controller configured to provide for adjustment of the light projected by the at least one LED, wherein said controller provides 5 sequential modes consisting of a 600 lumen mode, a 400 lumen mode, a 200 lumen mode, a strobe mode, and a beacon mode; and
   an activation button,
   wherein said casing is releasably secured to the smartphone, such that the porthole corresponds with the camera lens, and wherein depression of said activation button operates said flashlight independent of said smartphone.

2. The combination according to claim 1, further comprising a charging port for recharging the rechargeable battery.

3. The combination according to claim 1, further comprising a control circuit configured to control the operation of the LED and said rechargeable battery pack, said control circuit allows said rechargeable battery pack to be coupled to a smartphone battery providing a supplemental power supply.

4. The combination according to claim 1, wherein said activation button is positioned on a side surface of the casing.

5. The combination according to claim 1, wherein said LED is configured to emit light of different colors and intensities.

6. The combination according to claim 1, further comprising a light diffusion layer positioned between the LED and the back panel to provide uniform illumination.

7. The combination according to claim 1, wherein said activation button is configured to toggle the LED on and off or cycle through different lighting modes.

8. A combination comprising:
   a smartphone having a camera lens;
   a case having a rectangular shaped back panel with a porthole and a side surface;
   at least one LED formed integral to said casing;
   a rechargeable battery pack secured to said casing and electrically coupled to said LED;
   an activation button;
   a control circuit configured to provide for adjustment of the light projected by the at least one LED and to provide 5 sequential modes consisting of a 600 lumen mode, a 400 lumen mode, a 200 lumen mode, a strobe mode, and a beacon mode, the control circuit electronically coupled to said LED and interfacing with a smartphone App for remote operation of said LED;
   wherein said casing is releasably secured to the smartphone, such that the porthole corresponds with the camera lends, and wherein depression of said activation button operates said flashlight independent of said smartphone.

9. The combination according to claim 8, further comprising a charging port for recharging the rechargeable battery.

10. The combination according to claim 8, further comprising a control circuit configured to control the operation of the LED and said rechargeable battery pack, said control circuit allows said rechargeable battery pack to be coupled to a smartphone battery providing a supplemental power supply.

11. The combination according to claim 8, wherein said activation button is positioned on a side surface of the casing.

12. The combination according to claim 8, wherein said LED is configured to emit light of different colors and intensities.

13. The combination according to claim 8, further comprising a light diffusion layer positioned between the LED and the back panel to provide uniform illumination.

14. The combination according to claim 8, wherein said activation button is configured to toggle the LED on and off or cycle through different lighting modes.

* * * * *